Dec. 21, 1943.  P. TROMBETTA  2,337,430
RECIPROCATING ELECTRIC MOTOR
Filed Aug. 26, 1940
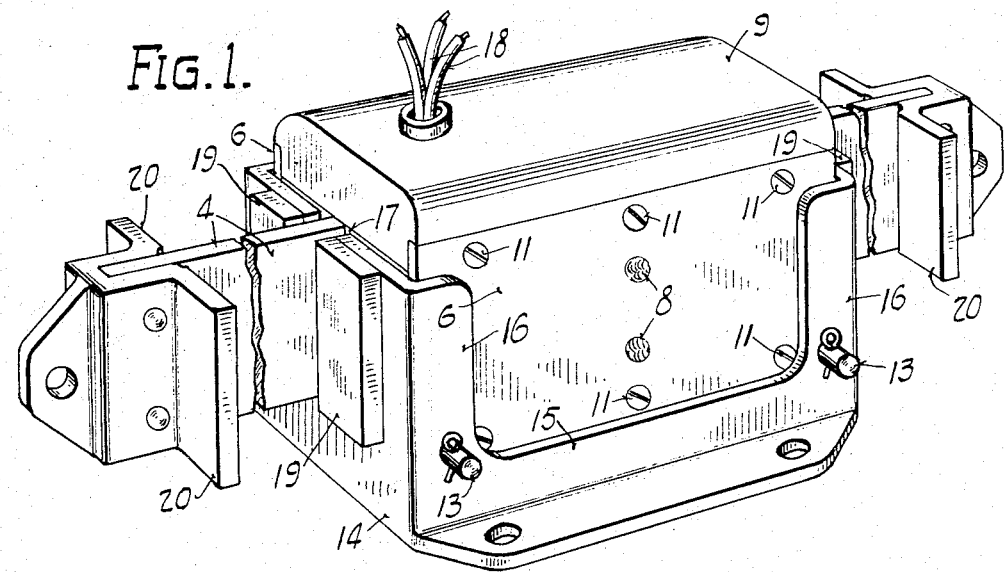
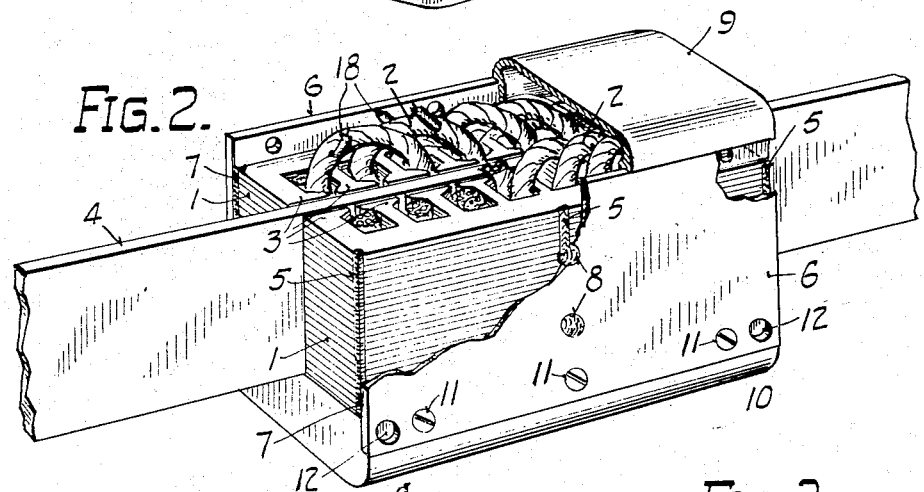
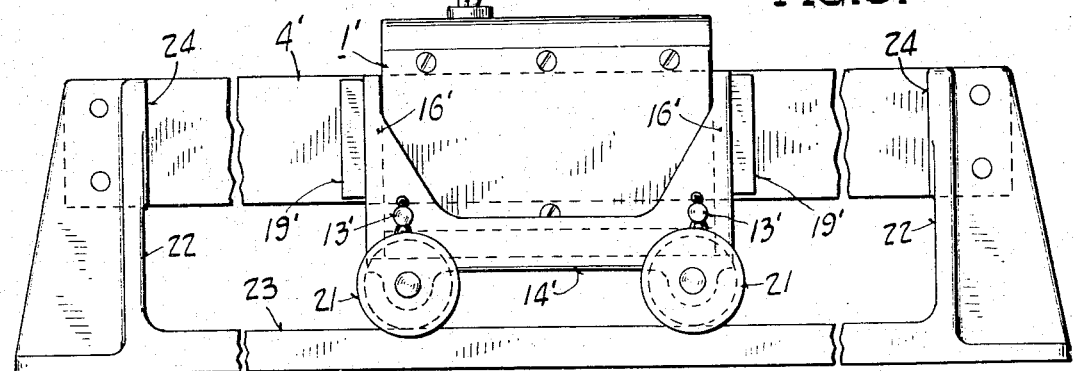
Panfilo Trombetta
INVENTOR.
BY
ATTORNEY.

Patented Dec. 21, 1943

2,337,430

UNITED STATES PATENT OFFICE 2,337,430

RECIPROCATING ELECTRIC MOTOR

Panfilo Trombetta, Milwaukee, Wis.

Application August 26, 1940, Serial No. 354,306

10 Claims. (Cl. 172—290)

This invention relates to reciprocating electric motors, and is applicable to both alternating current and direct current motors of both the induction and commutating types.

This application constitutes a continuation in part of application Serial No. 738,571, filed August 6, 1934, for Electromagnetic apparatus.

Heretofore, reciprocating motors have not been made on a commercial scale. In attempting to make them commercially it has been shown that in addition to the difficulties encountered in the design of the electrical parts, certain mechanical difficulties are encountered. One of the main mechanical difficulties lies in the large amount of kinetic energy present in the moving parts at the end of the useful working stroke.

Where immediate reversal of motion was required the kinetic energy of the moving parts could be partially overcome by the reversal in current or plugging. However, reliance upon such means for stopping the parts resulted in a time lag for reversal. It was impossible with such means to obtain the required accuracy both as to time and place of stopping.

Efficiently constructed motors for rapid operation were of relatively short life due to the design employed and shocks to the delicate laminations of the stator by reason of the impact of the armature or runner heads thereon soon affected the alignment and tightness of the laminations in such a way as to lower the efficiency considerably.

The object of the present invention is to provide a stronger, more durable straight line motor in which the delicate parts are protected from shock and which will have greater efficiency throughout a longer life.

Another object is to provide a straight line motor in which the stator sections are positively held from squeezing the armature.

Another object is to provide means for diverting the kinetic energy of the moving parts from the laminations of the stator.

Other objects will become manifest from the following description of a preferred embodiment of the invention which is illustrated in the accompanying drawing.

In the drawing:

Figure 1 is a perspective view of an induction type reciprocating motor employing a moving element of straight bar design;

Fig. 2 is a perspective view of the stator or field and armature with the cover and base broken away; and Fig. 3 is a side elevation showing a modified type of motor in which the field moves along the armature.

Referring to Figures 1 and 2, the motor comprises a laminated stator field core 1 having a winding 2 providing for magnetization of teeth 3 on the core. The winding 2 is merely illustrated as a single coil designed to obtain fractional pitch, it being understood that the complete winding comprises a plurality of such coils wound in between the respective teeth 3. Two such cores 1 constituting a motor stator are placed with the teeth 3 facing each other and spaced apart to accommodate a strip of metal 4 which serves as the armature. The armature 4 is moved longitudinally relative to the stator 1 by reason of the progressively moving magnetism of the stator.

The cores 1 have their laminations secured together by means of welds 5 in grooves at the rear corners and in the center, farthest away from flux concentrations.

A casing is provided for the stator to hold the two sections of the stator apart so that they do not squeeze the armature. For this purpose the casing comprises two side plates 6 which are welded at their ends to the respective sections of stator core as at 7. The plates 6 are also welded by plug welds 8 to the sides of the core sections to stiffen the latter against bending. The plates 6 extend a short distance above and below the stator sections and top and bottom cover plates 9 and 10 are inserted between them to hold them in definite spaced relation. The plates 6 are secured to the cover plates 9 and 10 by screws 11.

The lower corners of side plates 6 are provided with holes 12 for receiving pins 13 which secure the motor to a base 14.

The base 14 comprises a plate having upstanding flanges 15 on each side of the stator and having flanged upstanding ends 16 to confine the ends of the stator. The ends 16 have a slot 17 in them to receive the armature strip 4. The electrical connections are made by leads 18 extending through the cover plate 9.

In carrying out the invention the upstanding ends 16 of the base are provided with abutment faces 19 and the armature strip 4 has side flanges 20 for engaging the abutments as the armature reaches the end of its stroke in each direction. The engagement of flanges 20 with the corresponding abutments 19 serves to stop the armature and all parts moving with it, thereby dissipating the kinetic energy present upon completion of the stroke of the motor.

With the construction illustrated there is no shock or jar on the delicate laminated or softer parts of the apparatus and the impact takes place between parts well constructed to withstand the same. If the relative location of flanges 20 and abutments 19 permit, the kinetic energy will be dissipated at the same time as the current reversal takes place to return the armature, and the reversal of current is not wasted in providing energy to stop the moving parts. In stopping the motor by reversal of current or plugging the kinetic energy of the armature is in effect transferred into heat which appears on the armature, and a larger motor is required for a given performance of useful work in order to dissipate the additional energy, than is required with the present invention.

In Fig. 3 the stator 1' and base 14' are mounted on wheels 21 for longitudinal movement and the armature 4' is fixed at its ends to a stationary support 22. The wheels 21 operate on suitable tracks 23 extending between the supports 22. The upstanding ends 16' of the base have abutment faces 19' which engage stationary supports 24 on the supports 22 or the armature 4'. In this construction the stator actually moves longitudinally along the armature and when the abutment 19' engages the fixed support 24 at one end of the course, the stator will transmit its kinetic energy through pins 13' to the base. However, there being no impact on the core, and its kinetic energy being limited by its mass and rate of movement, there will be no injury to its delicate parts. The same is true with direct current motors although in them the core may not be laminated.

Various embodiments of the invention may be employed within the scope of the accompanying claims.

I claim:

1. In a reciprocating electric motor, relatively moving stator and armature members, windings to energize the stator to provide a magnetic field, a separate braking means to remove the kinetic energy of the moving parts upon completion of the movement in one direction while leaving the parts free to make said movement, and similar means for removing the kinetic energy of the moving parts upon completion of the movement in the opposite direction while leaving the parts free to make said movement, said means subjecting the armature member to longitudinal tension forces as distinguished from compression forces and serving to protect the stator and its windings from shock and to bring the moving parts to a stop for ready reversal of movement.

2. In a reciprocating electric motor, relatively moving stator and armature members, windings to energize the motor to provide a magnetic field, a base for supporting said motor and having side flanges between which the stator is secured, an abutment at each end of said base, and corresponding abutments on the armature for engagement therewith at the respective ends of the stroke of the apparatus to remove the kinetic energy of the moving parts without subjecting the armature to longitudinal compression forces which would tend to distort the same.

3. In a reciprocating electric motor, a stator, an armature passing therethrough for longitudinal movement, a base for supporting said stator, and a mechanical brake for stopping the movement of the armature at the end of each stroke thereof while leaving the armature free to move during said stroke and effecting longitudinal tension forces in the armature as distinguished from compression forces which would distort the same.

4. In a reciprocating electric motor, a stator disposed in a carrying element movable longitudinally in a predetermined path, an armature passing through the stator and its carrying element for determining the path of movement of the element, and a brake for stopping the movement of the stator carrying element at the end of its course of movement in each direction, said brake effecting longitudinal tension forces in said armature without retarding the stator carrying element during the course of movement.

5. In a reciprocating electric motor, a stator disposed in a carrying element movable along a track, an armature passing through the stator and its carrying element and extending along the track, and a brake for stopping the movement of the stator carrying element at the end of its course of movement, said brake operating without subjecting the armature to compression force tending to distort the same and permitting freedom of movement of the stator carrying element during the course of movement of the same.

6. In a reciprocating electric motor, a stator comprising a plurality of field core sections having energizing windings, an armature disposed to move between opposing sections of the core, side plates secured to the back sides of said core sections and extending beyond the same at the edges, and cover plates disposed between the extended portions of the side plates to hold the plates and core sections in predetermined spaced relation.

7. In a reciprocating electric motor, a stator comprising a field core section made up of a plurality of laminations of magnetically permeable material and having grooves in its face for receiving an energizing winding, weld beads along the back side of the section to hold the laminations together, and a side plate applied to the back side of the section and welded at its ends and through openings therein to the laminations.

8. In a reciprocating electric motor, a stationary stator member having a field core and windings to effect movement of an armature strip in a direction parallel to the face of the core, an armature for said motor, and a stop disposed to the rear of the line of movement of said armature and free from engagement with the armature until the stroke of the armature is completed to determine the stroke of said armature and protect the delicate electro-magnetic parts from shock.

9. In a reciprocating electric motor, a stationary armature strip having an abutment support at each end thereof, a moving field core with an energizing winding and having means to determine its path of movement along said strip, and a stop with a projecting abutment face to engage an abutment support at the end of a stroke to determine the stroke of said core member and prevent transmission of shock in service to the delicate electro-magnetic parts, said stop placing the armature strip under longitudinal tension.

10. In a reciprocating electric motor, a stationary armature strip, a moving field core with an energizing winding, a track for guiding said core member in its movement along said armature strip, and a stop disposed to determine the stroke of said core member and protect the delicate electro-magnetic parts from shock without placing compression forces in said armature strip, said stop comprising separate abutments on said field core member and said armature member disposed to engage one another on completion of a working stroke of the motor and to leave the members free for movement during the working stroke.

PANFILO TROMBETTA.